United States Patent
Shtivelman et al.

(10) Patent No.: US 6,263,066 B1
(45) Date of Patent: *Jul. 17, 2001

(54) MULTIMEDIA MANAGING AND PRIORITIZED QUEUING SYSTEM INTEGRATED WITH INTELLIGENT ROUTING CAPABILITY

(75) Inventors: Yuri Shtivelman, Belmont; Alec Miloslavsky, Hillsborough; Oleg Bondarenko, San Francisco; Igor Neyman, Palo Alto; Douglas Gisby, Foster City; Paul Cronin, Saratoga, all of CA (US)

(73) Assignee: Genesys Telecommunications Laboratories, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,729

(22) Filed: Jun. 11, 1998

Related U.S. Application Data

(63) Continuation-in-part of application No. 09/024,825, filed on Feb. 17, 1998, now Pat. No. 6,044,146, and a continuation-in-part of application No. 09/024,933, filed on Feb. 17, 1998, now Pat. No. 6,002,760, and a continuation-in-part of application No. 08/928,211, filed on Sep. 12, 1997, now Pat. No. 5,926,539, and a continuation-in-part of application No. 08/795,680, filed on Feb. 6, 1997, now Pat. No. 5,765,033.

(51) Int. Cl.[7] .............................. H04M 3/00; H04M 5/00
(52) U.S. Cl. ...................... 379/266; 379/265; 379/88.16; 379/88.13
(58) Field of Search .............................. 379/88.13, 88.17, 379/88.22, 88.23, 88.25, 93.24, 100.08, 265, 266, 309, 88.16; 370/352, 412, 444; 709/201, 206

(56) References Cited

U.S. PATENT DOCUMENTS

| | | | | |
|---|---|---|---|---|
| 5,309,505 | * | 5/1994 | Szlam et al. | 379/88.01 |
| 5,311,574 | * | 5/1994 | Livanos | 379/88.2 |
| 5,553,133 | * | 9/1996 | Perkins | 379/265 |
| 5,570,419 | * | 10/1996 | Cave et al. | 379/216 |
| 5,692,033 | * | 11/1997 | Farris | 379/67.1 |
| 5,761,289 | * | 6/1998 | Keshav | 379/201 |
| 5,765,033 | * | 6/1998 | Miloslavsky | 709/206 |
| 5,793,861 | * | 8/1998 | Haigh | 379/266 |
| 5,903,877 | * | 5/1999 | Berkowitz et al. | 705/26 |
| 5,905,793 | * | 5/1999 | Flockhart et al. | 379/266 |
| 5,920,621 | * | 7/1999 | Gottlieb | 379/265 |
| 5,926,539 | * | 7/1999 | Shtivelman | 379/266 |
| 6,002,760 | * | 12/1999 | Gisby | 379/266 |
| 6,044,146 | * | 3/2000 | Gisby et al. | 379/265 |

* cited by examiner

*Primary Examiner*—Fan Tsang
*Assistant Examiner*—Roland G. Foster
(74) *Attorney, Agent, or Firm*—Donald R Boys; Central Coast Patent Agency

(57) ABSTRACT

A queueing system in a call center is adapted to queue voice mails as well as live telephone calls. In a preferred embodiment the calls include both connection-oriented switched telephony (COST) calls and Data Network Telephony (DNT) calls. Callers are enabled to leave voice mail as an alternative to waiting, and records of the voice mails are queued, preferably in the same queue processing the live calls. In some embodiments the call center is enabled to process e-mails, video mails and facsimile messages as well as live calls and voice mail messages, and all types of multimedia communication can be queued in the same queue according to prestored routing rules and priority rules.

15 Claims, 2 Drawing Sheets

MULTIMEDIA MANAGING AND PRIORITIZED QUEUING SYSTEM INTEGRATED WITH INTELLIGENT ROUTING CAPABILITY

CROSS REFERENCE TO RELATED DOCUMENTS

The present invention is a continuation in part of patent applications Ser. No. 08/795,680 filed on Feb. 6, 1997 now U.S. Pat. No. 5,765,033, Ser. No. 08/928,211 filed on Sep. 12, 1997 now U.S. Pat. No. 5,926,539, Ser. No. 09/024,825 filed on Feb. 17, 1998 now U.S. Pat. No. 6,044,146, Ser. No. 09/024,933 filed on Feb. 17, 1998 now U.S. Pat. No. 6,002,760. The said priority cases are incorporated herein in their entirety by reference.

FIELD OF THE INVENTION

The present invention is in the field of computer telephony integration (CTI) communications including data network telephony (DNT), which encompasses Multimedia communications, and pertains more specifically to methods and apparatus for prioritizing, managing and routing multilemedia messages within a call center.

BACKGROUND OF THE INVENTION

Telephones are one of the most widely used communication tools in the world. At first, telephones were merely a convenient tool to allow people to communicate while they were physically separated. More recently, however, many companies use telephones to market products and services, provide technical support to customers, allow customers to access their own financial data, and so forth.

In order to more effectively use telephones for business and marketing purposes, call centers have been developed. In a call center, a relatively large number of agents handle telephone communication with clients. The matching of calls between clients and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database to obtain information about the client who has that phone number. The software can then better route the call to an agent who can best handle the call based on predefined criteria (e.g., language skill, knowledge of products the customer bought, etc.). The software also immediately transfers relevant information about the client to a computer screen used by the agent. Thus, the agent can gain valuable information about the customer prior to receiving the call. As a result, the agent can more effectively handle the telephone transaction.

It can be seen from the above example that the enabling technology requires a combination of telephone switching and computer information processing technologies. The term commonly used in the art for this combined technology is computer-telephony-integration (CTI).

In recent years, advances in computer technology, telephony equipment, and infrastructure have provided many opportunities for improving telephone service. Similarly, development of the information and data network known as Internet, together with advances in computer hardware and software have led to a new multimedia telephone system which will be referred to herein as data-network-telephony (DNT) which encompasses all multimedia-based communication including Internet Protocol Network Telephony (IPNT). IPNT is a special case of Data Network Telephony (DNT) wherein telephone calls are computer-simulated, and audio data is transmitted in the form of data packets.

In DNT systems as well as in the older intelligent and CTI-enhanced telephony systems, both privately and publicly-switched, it is desirable to handle more calls faster and to provide improved service in every way. This desire applies to multimedia-based communications in addition to telephone calls, as some call centers have moved to combine DNT with CTI technologies. It is emphasized that computer-simulated calls attributed to DNT may be made over company Intranets and other sorts of data networks as well as the Internet. The Internet is primarily used an as an example in this specification because it is broad and pervasive with universal protocol.

One of the major goals of any call center is to maximize client satisfaction. Part of the satisfaction that a client might receive from doing business with a company relates to how quickly and efficiently he or she is served. For example, when a client calls in to place an order for a product or service, he or she does not want to be put on hold for a lengthy period of time.

If a client sends an E-mail, Voice mail or another type of multimedia communication, he or she does not want to be overlooked or forgotten on an agent's computer. Rather, the client desires that a timely and professional response will be sent back by the company. This is especially true with company-to-company buying of products or services. A typical buyer has many duties that can be interrupted because of inordinate amounts of time spent waiting to place an order. In these types of situations, idle time costs money, and in many cases, cannot be tolerated. Many orders are lost by companies who have put clients in long waiting queues or subjected them to long waiting periods for multimedia responses. Such clients often become annoyed, perhaps searching for a suitable competitor who can meet their needs in a timely manner.

With call centers evolving into sophisticated and fast-paced communication centers wherein telephone and multimedia communications are routine, it becomes desirable to be able to prioritize and intelligently route all forms of communication with the goal of expedient and professional service to the client in mind.

Intelligent routing rules put in place in some intelligent networks known to the inventors have provided some relief for callers who would be stuck in queue much longer without them. For example, in some intelligent networks known to the inventor, skill-based routing, predictive routing, routing based on agent availability, as well as other intelligent implementations have provided for a better use of agent time within a call-center environment, thereby shortening queue length and reducing waiting time. However, even with these developments, there are certain peak periods during call-center operation that long waiting queues are unavoidable. Also, Intelligent routing rules, such as predictive routing or routing based on skill set of the agent are somewhat limited in current art to conventional telephone apparatus and calls, which are termed in this specification Connection-Orientated Switched Telephony (COST) calls.

Another problem in the current art involves separation of different protocols that are associated with different communication forms. Intelligent routing must typically be separately implemented for each communication method that uses a separate protocol. For example, an Email routing system would typically be separate from a COST call routing system, and so on. No viable solutions have been offered in current art that would integrate and combine functions of a routing system in order to provide priority and skill based routing for COST calls as well as DNT calls including multimedia communications.

What is clearly needed is a method and apparatus enabling the implementation and practice of an intelligent queuing and routing function adapted to any form of call-center communication wherein clients may have a priority established for their selected form of communication; have their communication routed based on intelligent information such as skill of the agent, availability; and receive a response in order of established priority. A system such as this would reduce hardware, software, and operating costs associated with separate routing systems, while at the same time, improve call-center service level and efficiency.

SUMMARY OF THE INVENTION

In a preferred embodiment of the present invention, in a call center having a switching apparatus adapted to receive and switch telephone calls to telephony apparatus at connected agent stations, a queueing system is provided, comprising a caller response system adapted for enabling callers to leave a voice mail message; and a queue controller. The queue controller queues records of voice mail messages left by callers and distributes the voice mail messages to agents at the connected agent stations as the records representing the voice mail messages reach head-of-queue.

There are a number of criteria that may be used for a basis for distribution (routing), among them availability of agents to deal with the voice mail messages and skill sets of agents. In preferred embodiments the voice mail messages are converted and stored as digital audio data, and are distributed to computers at agent's stations via a local area network connecting computer equipment at agent's stations. In some cases the call center queues records representing live telephone call in the same queue processing voice mail messages, and wherein live calls are distributed to agent's equipment on a basis of one or both of availability of agents to deal with the voice mail messages and skill sets of agents.

In the queueing system, in some embodiments, the live calls include both connection-oriented, switched telephony (COST) calls and data network telephony (DNT) calls. Also in some embodiments there are facilities for receiving and storing e-mails, video-mails and facsimile messages, and wherein the queue controller queues records of e-mails, video-mails and facsimile messages, as well as voice mail messages left by callers, and distributes the messages to agents at the connected agent stations as the records representing the messages reach head-of-queue. Live calls may be queued in the same queue processing e-mails, video mails, facsimile messages, and voice mail messages, and wherein live calls are distributed to agent's equipment on a basis of one or both of availability of agents to deal with the voice mail messages and skill sets of agents.

In another aspect of the invention a call center is provided, comprising a switching apparatus adapted to receive telephone calls, and to switch said calls to telephony apparatus at connected agent stations; an interactive voice response unit adapted to interact with calls to the call center, including allowing callers to leave voice mail messages; and a queueing system adapted to queue the voice mail messages for distribution to the connected agents. In some embodiments of the call center the voice mail messages are distributed to connected agents on a basis of one or both of availability of agents to deal with the voice mail messages and skill sets of agents, and the voice mail messages may be converted and stored as digital audio data, and are distributed to computers at agent's stations via a local area network connecting computer equipment at agent's stations.

In some embodiments the call center of the invention offers callers via an IVR an option for a call-back in a time less than the average waiting time. In this case the call-back is made automatically independent of the queue, and when contact is re-established with the original caller, the new call is placed in the queue at or near the head of the queue for very quick distribution to an appropriate agent.

In some embodiments a call center according to an embodiment of the invention the call center queues records representing live telephone call in the same queue processing voice mail messages, and wherein live calls are distributed to agent's equipment on a basis of one or both of availability of agents to deal with the voice mail messages and skill sets of agents. The live calls may include both connection-oriented, switched telephony (COST) calls and data network telephony (DNT) calls.

In some call centers according to embodiments of the invention there are systems for receiving and storing e-mails, video-mails and facsimile messages, and the queue controller queues records of e-mails, video-mails and facsimile messages, as well as voice mail messages left by callers, and distributes the messages to agents at the connected agent stations as the records representing the messages reach head-of-queue. Live calls may also be queued in this expanded queue in some embodiments, and distribution can be based on a number of criteria, such as availability of agents to deal with the voice mail messages and skill sets of agents.

In another aspect a method for distributing communications in a call center, the communications including voice-mail messages, is provided comprising steps of (a) enabling a caller to leave a voice-mail messages optionally as an alternative to waiting in a live-call queue for an agent; (b) queueing a record of the voice mail message alternatively to a live call; and (c) distributing the voice mail message to an agent as the record of the voice mail message reaches head-of-queue.

Methods of the invention in some embodiments may have the call center adapted to receive one or more of video mail, e-mail, and facsimile messages, as well as voice mail messages, and, in the queueing step, records of one or more of the video mail, e-mail, and facsimile messages are queued in the same queue processing voice mail messages. Records of live calls, both COST and DNT, may be queued in the same queue.

In an alternative embodiment a method for operating a queue for calls in a call center is provided, comprising steps of (a) informing a caller via interactive voice response (IVR) of waiting time, and offering a callback in a time shorter than the waiting time; (b) accomplishing the call-back in the offered time, making a new call with the original caller; and (c) placing the new call in the queue for distribution to an agent at or near the head of the queue for quick transfer to an appropriate agent.

The invention in all of its aspects is taught in enabling detail below, and provides to the art a comprehensive, multi-media distribution system for all sorts of communications, including voice-mail messages queued according to established routing rules.

BRIEF DESCRIPTION OF THE DRAWING FIGURES

DESCRIPTION OF THE PREFERRED EMBODIMENTS

As previously described with reference to the background section, it is found that while intelligent routing is performed within call centers with regards to COST calls, DNT calls, and E-mail in systems known to the inventor, but not necessarily known in the art, the routing function is typically not integrated to encompass multiple forms of received communication, and does not typically include faxes or voice-mails. Therefore, it is an object of the present invention to provide an intelligent, integrated routing system that will allow client's communications of all sorts to be stored according to pre-set priority rules, and be delivered to next-best available agents based on intelligent routing implementations such as skill-set of the agent, predictive routing, and so on. Such a system will also include typically overlooked forms of communication such as voicemail messages and facsimiles messages.

It is further an object of the present invention to provide a system as described above wherein live callers in queue may receive periodic options to change their form of communication to a virtual communication requesting a specific and timely response from a best-matched service agent.

Various elements found in the priority co-pending patent applications as listed in the "Cross-reference to related documents section" will be combined and employed along with newly innovative techniques and apparatus to provide the enabling disclosure of the present invention as provided in the examples to follow.

Figure 1:
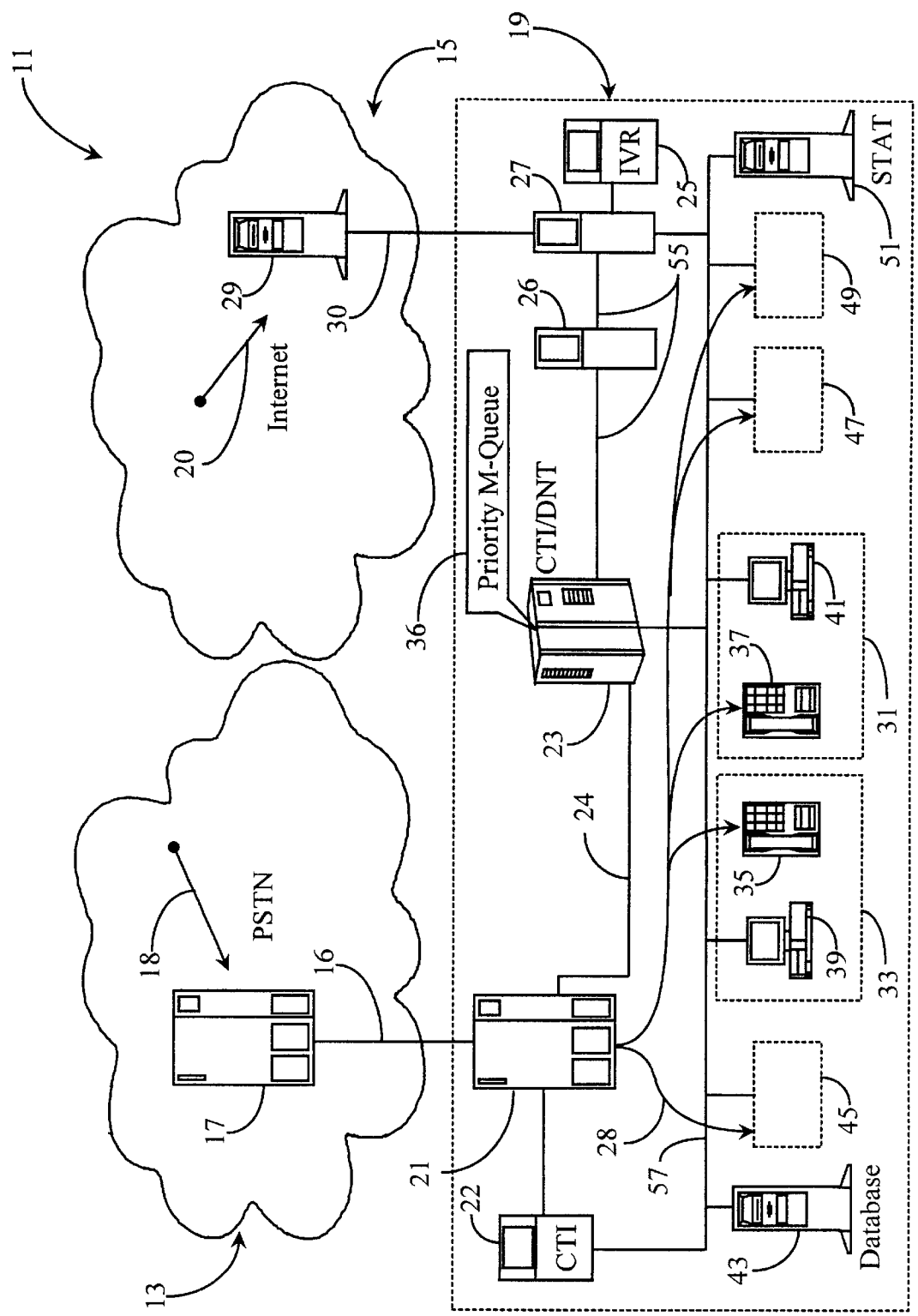
FIG. 1 is a system diagram illustrating a CTI/DNT-equipped call center according to an embodiment of the present invention wherein one intelligent routing system may route all communications received.

FIG. 1 is a system diagram illustrating a CTI/DNT-equipped call center according to a preferred embodiment of the present invention wherein one intelligent routing system using a single set of rules may route all call-center communications received. Communications architecture 11 comprises a CTI/DNT call-center 19 that is linked to a publicly-switched telephony network (PSTN) 13 via telephony trunks 16 and to a wide-area-network (WAN) 11, which in this embodiment is the well-known Internet, via a digital link 30. The Internet is used as an example because of it's universal nature, and standardized protocol. Internet 11 may, in other embodiments, be of the form of a corporate Intranet or other private WAN as may be known in the art. Also PSTN 13 may be of the form of a private telephone network rather than a public network as shown. The examples illustrated and taught herein utilize a public-access infrastructure only as a preferred embodiment. There are many other possibilities that are well known in the art.

COST calls represented by vector 18 arriving at a switching apparatus 17 in the PSTN may originate from anywhere in PSTN 13. Similarly DNT communications represented by a vector 20 arriving at an Internet routing node 29 may originate from any client having a computer running the appropriate software and having access to Internet 15.

Telephony trunks 16 will typically provide for outbound calls from call-center 19 as well as for in-bound calls switched from the network. Digital link 30 may take any of a number of forms capable of carrying DNT telephony data as well as other forms of digital data. Other network-level hardware such as additional processors, servers, and the like for enhancing pre-routing capabilities such as routing calls to additional call centers and so on are not shown in this embodiment, but may be assumed to be present. It may also be assumed that a company hosting a call center such as call center 19 may also host a number of additional centers distributed over a wide geographic range. However, the methods and apparatus of the present invention may also be applied for a single call center hosted by a single company or other organization.

Referring again to FIG. 1, COST calls to call center 19 arrive at a switching apparatus 21, typically at a routing point, where they await further switching per routing instruction. CTI enhancement to switch 21 is provided by a CTI processor 23 via a CTI link 24. Processor 23 is also connected to a local-area-network (LAN) 57 within call center 19, and via a link 55, through a CTI-adapter, to a router 27 further described below. CTI processor 23 is adapted, in this embodiment, to control both COST-related hardware and DNT-related hardware implemented within call center 19 with regards to routing execution of communication events as well as other control functions such as requesting additional information from other sources, and the like.

An interactive voice response (IVR) unit 22 is connected to switching apparatus 21 in a manner that COST calls may be switched to the IVR, and unit 22 is also connected to LAN 57 by which interaction with CTI processor 23 may be achieved. IVR 22 is adapted to handle incoming cost calls from switch 21 that are not immediately routed to an agent. An internal telephone wiring system 28 links individual agent's telephones to switch 21.

CTI Processor 23 is adapted, as one of many CTI applications it may provide, to creating and queuing electronic records representing client's COST calls, including retrieving and recording associated information related to the call. Provision may also be made in some embodiments for converting a connected COST call to a DNT call that may be routed over LAN 57 to a connected agent, to be processes by an agent's computer station having a video display unit (PC/VDU) using suitable software. This conversion function, if used, may reside in switching apparatus 21, or be adapted to the system in another way. In preferred embodiments CTI processor 23 also assigns priority to incoming calls based on predetermined rules.

In the present example, as shown in FIG. 1, there are five agent stations which share LAN 57. These are agent stations 45, 33, 31, 47, and 49. Two of the five agent stations, namely, stations 33 and 31 are shown in expanded view illustrating network and switch-connected components such as agent's telephones 35 and 37, and agent's PC/VDUs 39 and 41. It will be apparent to one with skill in the art that there may be many more than five agent stations within call center 19 without departing from the spirit and scope of the present invention, however, the inventor has deemed the illustration of five stations as shown herein to be adequate for the purpose of properly explaining the dynamics of the present invention. Further, some stations may be equipped for special functions, such as monitoring and supervision and the like.

Agents working within call center 19 are telephone-connected to switching apparatus 21 via wiring 28 from the switch to each of agent's telephones such as telephone 35. LAN access for each agent is provided through the agent's PC/VDU such as PC/VDU 41. In this way agents may receive DNT and COST calls at their respective stations. Also connected to LAN 57 is a database/information server 43 and a statistical server (Stat-Server) 51.

Server 43 in many embodiments records information related to clients, such as purchase history, shipping information, preferences, and other such parameters. Server 43 may also contain product information, inventory reports, etc. STAT server 51 records statistical information regarding agent history and performance including all customer transactions and dispositions as well as agent skill levels and agent status in real time. In this way, intelligent routing routines may rely upon up-to-date information regarding agent overall status and history for use in predictive routing.

It will be apparent to one with skill in the art that there may be several separate servers having dedicated functions connected to LAN 57 without departing from the spirit and scope of the present invention. The inventor has chosen to illustrate separate functions within a few connected servers such as servers 43, 51, and 23. It will be appreciated that the routing software and other control routines for intelligent routing will generally be implemented within processor 23. However, servers 43 and 51, as well as other dedicated servers or routers (not shown) that may be connected to LAN 57 may also execute routing routines. The embodiment shown here is but one example of many possible implementations.

In the example shown DNT communication via Internet 15 enters multimedia server 27 within call center 19. Multimedia server 27 in this embodiment is an E-mail server, as in related case Ser. No. 08/795,680, that has been further improved and adapted to accept electronic faxes, video-mail, DNT calls and the like. An IVR unit 25 adapted to handle live DNT calls and programmed to interact with callers is connected to multimedia server 27, and performs essentially the same functions for DNT calls (in this case IPNT calls), that are performed by IVR server 22 for COST calls. Multimedia-to-CTI adapter 26 is provided for the purpose of converting incoming multimedia communications into a record format that is transportable via LAN and may be understood by LAN-connected devices. In this way, all communication requests along with attatched information may be routed via a single set of routing rules.

Unique software of the present invention creates a prioritized multimedia-queue (M-Queue) 36 similar in many respects to the intelligent queue described with reference to co-pending patent application Ser. No. 09/024,933 wherein live and virtual communications may be prioritized and represented while awaiting further routing instruction. M-Queue 36 has all of the attributes of the queue of case Ser. No. 09/024,933 with the added adaptation that enables storing and processing records of all forms of multimedia communication, including DNT and COST calls. A prioritized multimedia-queue application for a queue such as queue 36 may reside in CTI processor 23, or in a separate LAN connected device. In some embodiments of the present invention, there may be more than one queue established by the software of the invention with each queue dedicated to different forms of communication and prioritized according to pre-set rules. However, due to an innovative technique of the present invention wherein any communication may be represented by a LAN-transportable virtual-communication record, one queue is all that is required.

In the case of a COST call, and in the event of heavy call loading, calls are routed to IVR 22. IVR 22 may inform the caller regarding the estimated time before an agent will be available and ask if the caller would rather leave a voice-mail message instead of waiting. If the caller leaves a message, it is prioritized and made of record as a virtual call and routed by CTI processor 23 taking it's place in queue according to pre-set criteria.

When the record of the voice-mail reaches the head of the queue, it is routed to the next best available agent utilizing all of the sophisticated routing protocol most often reserved for live calls, including the retrieval and inclusion of any relevant information associated with the record. The agent receiving the record initiates a response action based on the content of the record. For example, if the voice-mail requests a call-back, the agent may initiate the call, or transfer the request to an automated outbound dialing queue, including instruction provided by the caller as to time to call and the like. In one embodiment, automatic outbound dialing would be the routing destination for the record instead of the agent. In this way, the client may be called and connected to the agent with a high priority so as to insure connection.

In an alternative embodiment the IVR informs the caller of the wait time, and offers the caller an option of being called back at a time close to the wait time, and being placed back in the queue at the point where the call would be if placed in the queue originally. For example, in this embodiment, if the wait time in the queue is ten minutes, the IVR may schedule a call-back to the customer in 9 minutes and 45 seconds, and queue the call-back in an outbound dialer, which will make the call at the appointed time. After making connection with the customer again, the system places the new call in the queue at or near the head of the queue, so the live call will then be connected to an appropriate agent very quickly. By this method callers may be assured of being serviced in the time given as a wait time, alleviating any incredulity or mistrust, and establishing good will for the host of the call center.

In the case of a live DNT call, IVR 25 informs the client of the estimated waiting period before an agent will be available to answer the DNT call. An electronic voice message may be left by the customer, stored and routed in the same manner as virtual calls representing COST calls, as described immediately above. Multimedia-to-CTI adapter 26 makes record of and prioritizes the message for placement in queue 36 according to preset rules. Again, when the record advances to the head of the queue, it is routed to a next best agent over LAN 57. The agent receiving the record may initiate the requested response.

In the event that a caller, informed of delay by an IVR, elects to wait for an agent, then the record will indicate a live call waiting either at switch 21 (COST call) or at multimedia server 27 (DNT call). The virtual-queuing function may operate as the default mode, or be set to become operative during times of need such as peak-load hours.

Prioritizing communications may depend only on the type of media used. For example, live calls may be identified to assume highest priority while faxes assume the lowest priority. Priority may also be established according to additional customer information that may be retrieved from database 43. For example, an E-mail from a company's largest buyer will be assigned a higher priority than a voice-mail from a smaller buyer, and so on. A parser tool may also be used to review certain types of messages, such as E-mail or faxes, in order to assign priority based on content of the message.

IVRs such as IVR 22 or 25, in addition to offering voice-messaging, may also offer a series of generic automated responses such as fax-backs or E-mails containing standard information. In this case, the record would automatically be routed to such automated services transparent to the agent.

As previously described in co-pending patent application Ser. No. 09/024,933, a virtual queue is provided wherein callers may disconnect from the call center after being queued without losing their place in the queue. When their virtual call reaches the head of the queue the client is called back and connected to a next best available agent to handle the call.

In co-pending case Ser. No. 09/024,825, a queue is provided that allows calls to be prioritized and sequentially stacked so that the highest priority calls are routed first according to existing routing rules. As described in numerous examples in the specification of that prior application, the prioritizing technique can be used with virtually any type of routable communication such as E-mail, V-mail, faxes, Internet protocol (IP) calls, and so on. However, different forms of communication would be handled separately (different queues), with live callers required to remain connected to the call center until their call is answered.

An object of the present invention is to combine the innovative aspects and technology found in the above described cases and further improve the combination to obtain the queuing system of the present invention.

Figure 2:
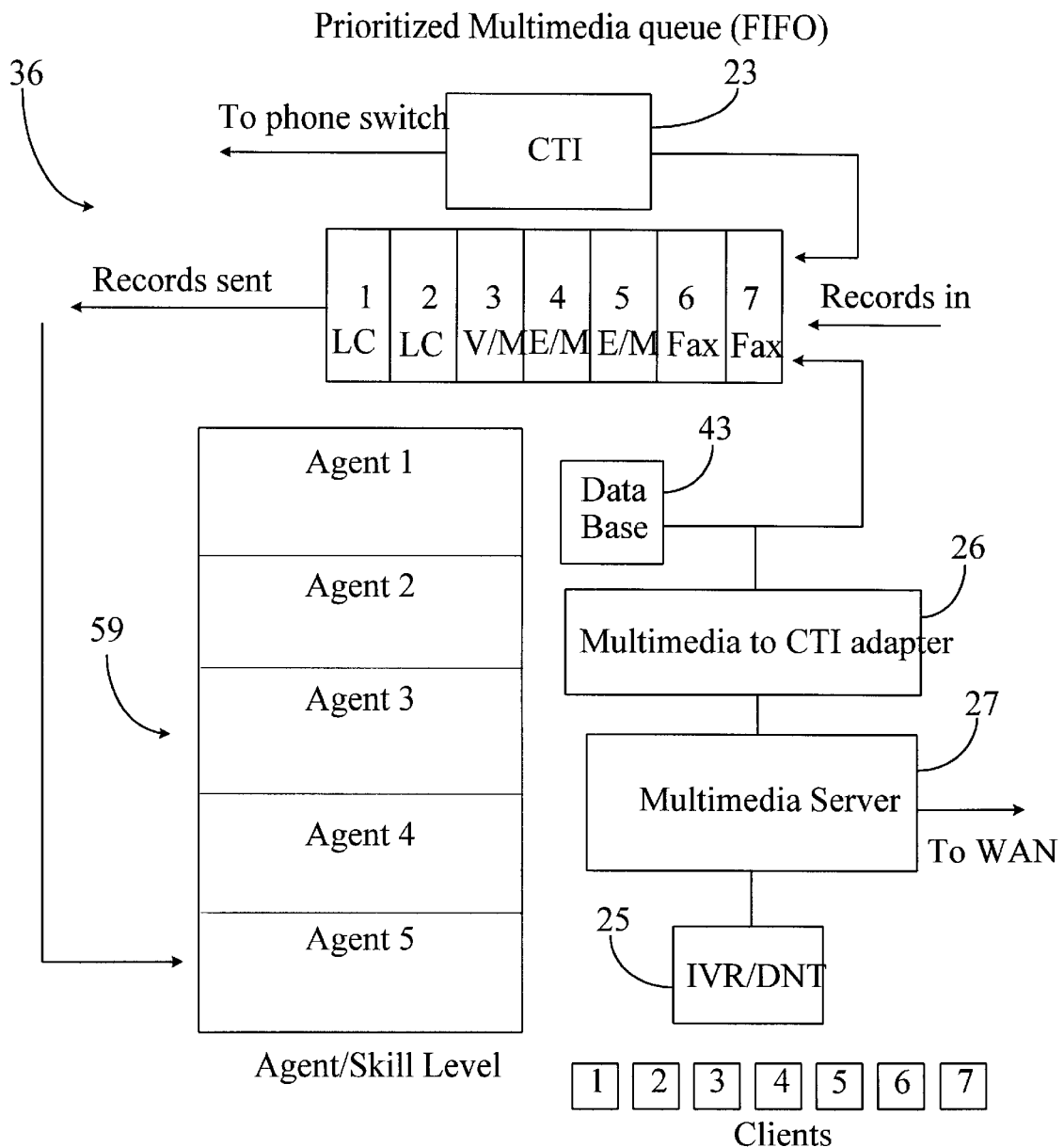
FIG. 2 is a block diagram illustrating a multimedia queue according to an embodiment of the present invention.

FIG. 2 is a block diagram illustrating a multimedia queue according to an embodiment of the present invention. Queue 36 is a virtual queue wherein all communications may be represented by records, and wherein live callers may disconnect and be called back without losing their place in the queue. In addition to live calls (both COST and DNT), E-mails, video-mails, voice mails, faxes, and the like may be made record of and placed in queue 36. The record created for each type of communication is standardized with respect to format for the purpose of universal understanding by LAN-connected devices such as PC/VDUs operated by the agents. With respect to live calls as described above, a client placing a live call may elect to hold with the record so designating. A client electing not to hold may instead place a voice mail, perhaps requesting a call-back with the record so designating.

An innovation inherent to the present invention is a fact that each record representing a type of communication may be routed according to existing routing rules such as skill-based and predictive rules. A further innovation inherent to the present invention allows for prioritizing the records in a combined fashion using a single set of rules. Record priority bumping may take place in the queue regardless of communication type.

Some attributes used in multimedia are not generally compatible with telephony-based LAN-connected storage and routing services such as with E-mails for example. An E-mails reply address may not be recognizable to a LAN connected storage device or to routing software that is generally used for the routing of telephone calls. This condition is described with reference to co-pending application Ser. No. 08/795,680. For this reason, a multimedia-to-CTI adapter 26 is used to convert such attributes to a format that can be easily understood by routing and storage software. After the proper formatting is performed in adapter 26, then the record is created and prioritized. Actual multimedia communications may be stored in a separate dedicated LAN-connected server or servers. Multimedia to CTI adapter 26 is equipped to retrieve infonnation from other sources on the LAN much the same way as IVR 22.

Yet a further innovation allows the actual multimedia message such as a voice mail to be routed in unison or in parallel with the record. More specifically, the actual media is retrieved and routed based on the direction of the record. Multimedia-to-CTI adapter 26 formats all media that is not a live call for transport over the LAN to connected devices and systems. The agent may receive a notice of the record and then retrieve the media, or the media can be routed to the agent based on the record.

Referring now to FIG. 2, there are 7 records 1–7 representing various forms of communication placed in queue 36. In this embodiment, the records are prioritized according to media type. For example, records 1 and 2 are live calls (one is a COST call and the other a DNT call, although this distinction is not shown in the figure), record 3 represents a voice mail left by a live caller who has elected to disconnect from the call center during the waiting period associated with queue 36. Records 4 and 5 represent E-mails, while records 6 and 7 represent faxes. One can appreciate that they are stacked according to assigned priority.

It will be apparent to one with skill in the art that queue 36 may contain many more records of communication than are illustrated here, however, the inventor has deemed 7 such records sufficient for the purpose of adequately describing the present invention. It will also be apparent to one with skill in the art that there are many possible priority rules that may be implemented and applied to queue 36 without departing from the spirit and scope of the present invention. The example illustrated herein is but one of those many possibilities.

Because the records are universally understandable to LAN-connected devices and intelligent routing software, they may be stored in a single general queue as shown here. However, separate queues may be used if desired without departing from the spirit and scope of the present invention. Such a case may be if facilities or departments responding to the records are divided by media type and separated geographically.

A group of agents 59 represents the agents of FIG. 1 residing at agent stations 45, 33, 31, 47, and 49. Each agent in group 59 has a specific skill set, although an indication of each set is not indicated in the figure. For example, agent 1 is a software specialist. Agent 2 is a hardware specialist while agent 3 is a hardware specialist who also speaks fluent Spanish. Agent 4 is a troubleshooting specialist. Agent 5 is a shipping coordinator.

As previously described, records 1–3 are voice mails that were left after clients placing COST calls were prompted via IVR 22. IVR 22 is multi-taskable meaning that it may interact simultaneously with a number of clients according to a number of different criteria. For example, voice recognition may be used to determine the original nature of a call. Touch tone techniques may then be employed to offer the client an option of perhaps leaving a voice mail or receiving an automated fax or E-mail.

In one embodiment, IVR 22 is enhanced with outbound dialing capability (or interfaced with an outbound dialer) so that if a client requests a call back, his record may queued in an outbound queue. When his or her record advances to the head of the queue, the outbound dialer will place the call to the destination number of the client and connect the client to an available agent when he or she answers the call. Such outbound calls may be given priority over normal incoming calls so that requeuing would not be required.

Other automated services may be provided by the call center such as automated faxes, E-mails, voice messages and the like. In these cases, IVRs 22 and 25 would offer the services as an option. If the client only seeks information and does not require a live agent, he or she may well select an automated response. In this case, the record would be routed to the appropriate automated system to prepare and send the information according to the media type selected. In this way, agents may be kept busy answering calls and responding to other communications that actually require their attention.

CTI server 23 creates digital records of COST calls according to customer preference with regard to available options, and assigns a priority for each record. One function of the innovative software allows retrieval of stored information regarding the client in order to aid the prioritizing process. The actual recorded voice mail may be stored in a separate multimedia database such as database 43 of FIG. 1. When the record is routed to an available agent, the actual voice-mail may be retrieved by the agent, or may be routed in unison with the corresponding record.

In this embodiment, record 1 is a live call from a client seeking particulars of a recently shipped order. Therefore, when this call reaches the head of the queue it is routed to agent 5 who is the shipping coordinator. Record 2 in this example is from a Spanish-speaking client with a hardware problem to solve. When record 2 advances to the head of the queue it will be routed to agent 3 who handles hardware and speaks Spanish. All records are so routed unless they are destined for automated services as previously described.

Multimedia server 27 receives communications from clients by way of a WAN such as Internet 15 of FIG. 1. It will be appreciated that live communication as well as E-mails, Video mails, file transfers, and the like may enter multimedia server 27. IVR 25 (a digital equivalent to IVR 22) intercepts live communications such as a DNT call. The same services may be offered to a client by IVR 25 as described with reference to IVR 22 as well as allowing the client to leave a voice-mail message, which may be recorded and routed.

In one embodiment of the present invention, separate servers may be used for separate media forms such as a fax server for faxes, an E-mail server for E-mails, a digital server for Video-mails and other audio-visual media, and so on. However, in a preferred embodiment, one digital storage facility/server may be used. COST clients may leave voice messages by phone that are then digitized and stored with other multimedia communications. In this way, a COST client requesting a call back on the telephone may have his voice mail accessed via the agent's PC/VDU instead of from a traditional voice mail box.

Referring again to FIG. 2, records one through 7 have been created, prioritized and queued in queue 36. If a record 8 is now created and enters queue 36, it may be assigned a higher priority than records already entered. For example, record 8 may be a video-mail from a client known to be the largest single buyer of the company's products or services. In this case, record 8 would perhaps bump record 1 thereby being the next record at the head of the queue.

In one embodiment, wherein such a VIP client has placed a live call, then immediate routing may take place bypassing the queue altogether. When an agent receives notification of such a call, a current transaction engaged in by the agent may be terminated to free the agent for the call and so on. In another embodiment, IVR 22 (if a COST call) or IVR 25 (if a DNT call) may, through accessing stored records, assign a highest priority in queue 36 including welcoming the client by name and assuring him or her that there is no need to disconnect as the call will move immediately to the head of the queue. Such a personal feature may help companies to secure high value clients.

It will be apparent to one with skill in the art that different types of companies will vary in the way they set routing and priority rules with regards to queue 36. It will also be apparent to one with skill in the art that companies hosting call centers that do not engage in one or more forms of communication covered in this specification may still practice the present invention with communication media that is practiced. The method and apparatus may be implemented in a COST-call center, a DNT-only call center, or in a combination CTI/DNT call center as taught herein without departing from the spirit and scope of the present invention.

Intelligent routing implementations such as predictive routing, skill-based routing, statistical routing, and other types of intelligent implementations can now be performed with all media types using a single set of rules. There are many possible implementations some of which have already been described. The spirit and scope of the present invention is limited only by the claims that follow.

What is claimed is:

1. In a multimedia call center having a switching apparatus for receiving and switching media requests including connection-oriented, switched telephony (COST) telephone calls, and Internet protocol network telephony (IPNT) calls to telephony apparatus at connected agent stations, a queuing system comprising;
   an interactive voice response (IVR) system advising a COST caller, or an IPNT caller of expected wait time in queue and enabling the caller to leave a callback request; and
   a queue controller;
   wherein a call back request from either the COST or IPNT call is queued at the same point in the queue the call would be if originally placed in queue when the call was initially received, before interaction with the IVR or server, a call back is placed such that connection with the caller is achieved by the time the call back request reaches the head of queue, and after establishing a live call with the original caller via the call-back the queuing system places the resulting live call at or near the head of the queue for quick distribution to an appropriate agent.

2. The queuing system of claim 1 wherein the queued call back request and the routing of the resulting live call take place at a time less than the average queue waiting time advised by the call response system.

3. The queuing system of claim 1 wherein the voice mail messages are converted and stored as digital audio data, and are distributed to computers at agent's stations via a local area network connecting computer equipment at agent's stations.

4. The queuing system of claim 1 wherein the call center queues records representing live calls in the same queue processing voice mail messages, and wherein voice mail messages and the live calls are distributed to agent's equipment on a basis of one or both of availability of agents to deal with the voice mail messages and skill sets of agents.

5. The queuing system of claim 1 further comprising systems for receiving and storing e-mails, video-mails and facsimile messages, and wherein the queue controller queues records of e-mails, video-mails and facsimile messages, as well as voice mail messages left by callers, and distributes the messages to agents at the connected agent stations as the records representing the messages reach head-of-queue.

6. The queuing system of claim 5 wherein the call center queues records representing live COST and IPNT calls in the same queue processing emails, video mails, facsimile messages, and voice mail messages, and wherein live calls are distributed to agent's equipment on a basis of one or both of availability of agents to deal with the messages and skill sets of agents.

7. A multimedia call center comprising:
   a switching apparatus receiving connection-oriented, switched telephony (COST) telephone calls, and a server interacting with Internet protocol network telephony (IPNT) calls, and switching said calls to telephony apparatus at connected agent stations;

an interactive voice response (IVR) unit interacting with the COST calls and the server interacts with the IPNT calls to the call center, including advising callers of expected wait time in queue and allowing callers to leave call back requests; and a queuing system queuing call back requests at the same point in the queue the call would be if originally placed in the queue when initially received, and before the call back request reaches the head of the queue the call back is placed to enable connection with the caller by the time the call back request reaches the head of the queue and the resulting live COST or IPNT call is placed at or near the head of the queue for immediate routing to an available agent.

8. The call center of claim 7 wherein the queued call back request and the routing of the resulting live call take place at a time less than the average queue waiting time advised by the IVR, or the server.

9. The call center of claim 7 wherein the voice mail messages are converted and stored as digital audio data, and are distributed to computers at agent's stations via a local area network connecting computer equipment at agent's stations.

10. The call center of claim 8 wherein the call center queues records representing live COST and DNT calls in the same queue processing voice mail messages, and wherein live calls and voice mail messages are distributed to agent's equipment on a basis of one or both of availability of agents to deal with the live calls and voice mail messages and skill sets of agents.

11. The call center of claim 7 further comprising systems for receiving and storing e-mails, video-mails and facsimile messages, and wherein the queue controller queues records of e-mails, video-mails and facsimile messages, as well as voice mail messages left by callers, and distributes the messages to agents at the connected agent stations as the records representing the messages reach head-of-queue.

12. The call center of claim 11 wherein the call center queues records representing live COST and IPNT calls in the same queue processing e-mails, video mails, facsimile messages, and voice mail messages, and wherein live calls are distributed to agent's equipment on a basis of one or both of availability of agents to deal with the messages and skill sets of agents.

13. A method for distributing multimedia communications, including connection-oriented, switched telephony (COST) telephone calls, and Internet protocol network telephony (IPNT) calls in a call center, the communications including call back requests, comprising steps of, (a) enabling a caller of a COST call or IPNT call to leave a call back request optionally as an alternative to waiting a predetermined time in a live-call queue for an agent;

(b) queuing a record of the call back request alternatively to a live call in the same position in the queue the live call would have been if originally queued;

(c) placing a call back as a result of the call back request before the call back request reaches the head of the queue such that connection with the caller is achieved by the time the call back request reaches head of queue; and (e) placing a live call resulting from the call back at or near the head of the queue for immediate routing to an available agent.

14. The method of claim 13 wherein the call center receives one or more of video mail, e-mail, and facsimile messages, as well as voice mail messages, and wherein, in the queuing step records of one or more of the video mail, e-mail, and facsimile messages are queued in the same queue processing voice mail messages.

15. The method of claim 13 wherein, in step (b) records of live COST and IPNT calls are queued in the same queue processing voice mail messages.

* * * * *